United States Patent
Fritz-Langhals et al.

(10) Patent No.: US 10,730,893 B2
(45) Date of Patent: Aug. 4, 2020

(54) NOBLE METAL-FREE HYDROSILYLATABLE MIXTURE

(71) Applicant: WACKER CHEMIE AG, Munich (DE)

(72) Inventors: Elke Fritz-Langhals, Ottobrunn (DE); Peter Jutzi, Bielefeld (DE); Richard Weidner, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 16/091,026

(22) PCT Filed: Mar. 10, 2017

(86) PCT No.: PCT/EP2017/055622
§ 371 (c)(1),
(2) Date: Oct. 3, 2018

(87) PCT Pub. No.: WO2017/174290
PCT Pub. Date: Oct. 12, 2017

(65) Prior Publication Data
US 2019/0071459 A1  Mar. 7, 2019

(30) Foreign Application Priority Data
Apr. 4, 2016 (DE) .......................... 10 2016 205 526

(51) Int. Cl.
*C07F 7/08* (2006.01)
*C07F 17/00* (2006.01)

(52) U.S. Cl.
CPC ............ *C07F 7/0879* (2013.01); *C07F 17/00* (2013.01)

(58) Field of Classification Search
None
See application file for complete search history.

(56) References Cited

U.S. PATENT DOCUMENTS 10,239,896 B2  3/2019  Nagashima et al.
2017/0260216 A1*  9/2017  Nagashima .............. B01J 31/22

FOREIGN PATENT DOCUMENTS

JP  2016041414 A  3/2016

OTHER PUBLICATIONS

Leszczy NPL—Angew. Chem. Int. Ed. , 2011, 123, 6975-6978. (Year: 2011).*
Leszczy et al., Angew. Chem. 2011, 123, 6975-6978. (Year: 2011).*
Hans-Uwe Steinberger et al., A metal-free catalytic intramolecular hydrosilylation, Can. J. Chem. 2003, 81, 1223-1227, 2003 NRC Canada.
Cheuk-Wai So et al., A Silyliumylidene Cation Stabilized by an Amidinate Ligand and 4-Dimethylaminopyridene, Chem. Eur. J. 2013, 19, 11786-11790, 2013 Wiley-VCH Verlag Weinheim, Germany.
Matthias Driess et al., Low-Valent Silicon Cations with Two-Coordinate Siliocn and Aromatic Character, Angew. Chem. Int. Ed. 2006, 45, 6730-6733, 2006 Wiley-VCH Verlag Weinheim, Germany.
Alexander C. Filippou et al., Silicon(II) Coordination Chemistry: N-Heterocyclic Carbene Complexes of Si2+ and Sil+, Angew. Chem. Int. Ed. 2013, 52, 6974-6978, 2013 Wiley-VCH Verlag Weinheim, Germany.
Takahiro Sasamori et al., Reactions of Diaryldibromodisilenes with N-Heterocyclic Carbenes: Formation of Formal Bis-NHC Adducts of Silyliumylidene Cations, Chem. Eur. J. 2014, 20, 9246-9249, 2014 Wiley-VCH Verlag Weinheim, Germany.
Shigeyoshi Inoue et al., A facile access to a novel NHC-stabilized silyliumylidene ion and C—H activation of phenylacetylene, Chem. Commun. 2014, 50, 12619-12622, The Royal Society of Chemistry 2014, London, UK.
Ingo Krossing et al., Nichtkoordinierende Anionen—Traum oder Wirklichkeit? Eine Übersicht zu möglichen Kandidaten, Angew. Chemie 2004, 116, 2116-2142, 2004 Wiley-VCH Verlag Weinheim, Germany.
Peter Jutzi et al., The (Me5C5)Si+ Cation: A Stable Derivative of HSi+ Science 2004, 305, 849-51, 2004 AAAS, Nashington DC, USA.
Kinga Leszczynska et al., The Pentamethylcyclopentadienylsilicon(II) Cation as a Catalyst for the Specific Degradation of Oligo(ethyleneglycol) Diethers, Angew. Chemie Int. Ed., 2011, 6843-6846, 2011 Wiley-VCH Verlag Weinheim, Germany.
Joseph Lambert et al., ß-Silyl and ß-Germyl Carbocations Stable at Room Temperature, J. Org. Chem. 1999, 64, 8, 2729-2736, 1999 American Chemical Society.
Peter Jutzi, The Pentamethylcylcopentadienylsilicon(II) Cation: Synthesis, Characterization, and Reactivity, Chem. Eur. J. 2014, 20, 9192-9207, 2014 Wiley-VCH Verlag Weinheim, Germany.

* cited by examiner

*Primary Examiner* — Clinton A Brooks
*Assistant Examiner* — Kofi Adzamli
(74) *Attorney, Agent, or Firm* — Brooks Kushman P.C.

(57) ABSTRACT

The invention relates to a hydrosilylatable mixture M containing: (A) a compound with at least one hydrogen atom directly bonded to Si, (B) a compound containing at least one carbon-carbon multiple bond, and (C) a compound containing at least one cationic Si(II) group. The invention also relates to a method for hydrosilylating the mixture M.

10 Claims, No Drawings

NOBLE METAL-FREE HYDROSILYLATABLE MIXTURE

CROSS-REFERENCE TO RELATED APPLICATIONS

This application is a U.S. National Phase Application of PCT/EP2017/055622, filed Mar. 10, 2017, which claims priority to German Application No. 10 2016 205 526.7 filed on Apr. 4, 2016 the contents of which are incorporated herein by reference in their entireties for all purposes.

FIELD OF THE INVENTION

The invention relates to a hydrosilylable mixture comprising a compound having a cationic Si(II) moiety as catalyst.

BACKGROUND OF THE INVENTION

The addition of hydrosilicon compounds to alkenes and alkynes to form an Si—C linkage plays an important role in industry. This reaction, referred to as hydrosilylation, is used, for example, for crosslinking siloxanes or for introducing functional groups into silanes or siloxanes. Hydrosilylation is generally catalyzed by noble metal complexes. Platinum, rhodium or iridium complexes are very often used, which considerably raises the cost of the method, particularly when the noble metal cannot be recovered and remains in the product.

The noble metals are only available to a limited extent as raw materials and are subject to unpredictable and uncontrollable price fluctuations. A hydrosilylation catalyst that is free of noble metal is therefore of major industrial interest.

The object of the present invention therefore consists of providing a noble metal-free hydrosilylation catalyst. Metal-free catalysts are occasionally described in the literature. The tritylium cation is known as a cationic catalyst in Can. J. Chem. 2003, 81, 1223, but the catalytic activity of which could only be demonstrated in a special case, that of an intramolecular hydrosilylation.

BRIEF SUMMARY OF THE INVENTION

The invention relates to a hydrosilylable mixture M comprising
(A) a compound having at least one hydrogen atom bonded directly to Si,
(B) a compound comprising at least one carbon-carbon multiple bond and
(C) a compound comprising at least one cationic Si(II) moiety.

DETAILED DESCRIPTION OF PREFERRED EMBODIMENTS

It has now been found that, surprisingly, silicon(II) compounds which are present in cationic form—so-called silyliumylidene cations—catalyze hydrosilylation reactions. Therefore, mixture M is hydrosilylable without noble metal catalyst. The cationic Si(II) moiety is highly effective as hydrosilylation catalyst.

Compound A, having at least one hydrogen atom bonded directly to Si, preferably has general formula I $$R^1R^2R^3Si-H \qquad (I)$$

wherein the radicals $R^1$, $R^2$ and $R^3$ each independently have the definition hydrogen, halogen, silyloxy radical, hydrocarbon radical or hydrocarbonoxy radical, wherein individual carbon atoms in each case may be replaced by oxygen atoms, silicon atoms, nitrogen atoms, halogen, sulfur or phosphorus atoms.

Particularly preferably, the radicals $R^1$, $R^2$ and $R^3$ are each independently hydrogen, halogen, unbranched, branched, linear, acyclic or cyclic, saturated or mono- or polyunsaturated C1-C20 hydrocarbon radical or unbranched, branched, linear or cyclic, saturated or mono- or polyunsaturated C1-C20 hydrocarbonoxy radical, wherein individual carbon atoms may be replaced by oxygen, halogen, nitrogen or sulfur, or silyloxy radical of general formula II $$(SiO_{4/2})_a(R^xSiO_{3/2})_b(R^x{}_2SiO_{2/2})_c(R^x{}_3SiO_{1/2})_d- \qquad (II)$$

in which
$R^x$ are each independently hydrogen, halogen, unbranched, branched, linear, acyclic or cyclic, saturated or mono- or polyunsaturated C1-C20 hydrocarbon radical or unbranched, branched, linear or cyclic, saturated or mono- or polyunsaturated C1-C20 hydrocarbonoxy radical, wherein individual carbon atoms can be replaced by oxygen, halogen, nitrogen or sulfur,
a, b, c and d are each independently integer values from 0 to 100 000, wherein the sum total of a, b, c and d together has at least the value 1.

Especially preferably, the radicals $R^1$, $R^2$ and $R^3$ are each independently hydrogen, chlorine, C1-C3-alkyl or alkylene radical, phenyl radical, C1-C4 alkoxy radical or silyloxy radical of general formula II, in which $R^x$ are each independently hydrogen, chlorine, C1-C6 alkyl or alkylene, phenyl or C1-C6 alkoxy.

Radicals $R^1$, $R^2$ and $R^3$ are particularly preferably the radicals methyl, methoxy, ethyl, ethoxy, propyl, propoxy, phenyl, chlorine or silyloxy radical, especially of general formula II.

Radicals $R^x$ are particularly preferably the radicals methyl, methoxy, ethyl, ethoxy, propyl, propoxy, phenyl and chlorine.

Examples of compounds A of general formula (I) are the following silanes (Ph=phenyl, Me=methyl, Et=ethyl):
Me$_3$SiH, Et$_3$SiH, Me$_2$PhSiH, MePh$_2$SiH, Me$_2$ClSiH, Et$_2$ClSiH, MeCl$_2$SiH, Cl$_3$SiH, Me$_2$(MeO)SiH, Me(MeO)$_2$SiH, (MeO)$_3$SiH, Me$_2$(EtO)SiH, Me(EtO)$_2$SiH, (EtO)$_3$SiH, (Me)$_2$HSi—O—SiH(Me)$_2$
and the following siloxanes:
HSiMe$_2$-O—SiMe$_2$H, Me$_3$Si—O—SiHMe-O—SiMe$_3$,
H—SiMe$_2$-(O—SiMe$_2$)$_m$—O—SiMe$_2$-H where m=1 to 20 000,
Me$_3$Si—O—(SiMe$_2$-O)$_n$(SiHMe-O)$_o$—SiMe$_3$ where n=1 to 20 000 and o=1 to 20 000.

Compound A can also be a mixture of different compounds of general formula (I), in which the radicals $R^1$, $R^2$ and $R^3$ can optionally be different radicals to general formula (II).

Compounds B, having at least one carbon-carbon multiple bond, are preferably selected from compounds having at least one carbon-carbon double bond of general formula IIIa $$R^4R^5C=CR^6R^7 \qquad (IIIa),$$

and from compounds having at least one carbon-carbon triple bond of general formula IIIb $$R^8C\equiv CR^9 \qquad (IIIb),$$

wherein
$R^4$, $R^5$, $R^6$, $R^7$, $R^8$ and $R^9$ are each independently linear, branched, acyclic or cyclic, saturated or mono- or polyunsaturated C1-C20 hydrocarbon radical, wherein individual carbon atoms may be replaced by silicon, oxygen, halogen, nitrogen, sulfur or phosphorus.

Mixtures of compounds of general formula IIIa and IIIb may also be present.

Particularly preferably, the radicals $R^4$, $R^5$, $R^6$, $R^7$, $R^8$ and $R^9$ are each independently hydrogen, linear, branched, acyclic or cyclic, saturated or mono- or polyunsaturated C1-C6-hydrocarbon radical, which may be substituted by one or more heteroatom moieties, in particular the moieties halogen, especially chlorine, amino, nitrile, alkoxy, $COOR^z$, O—CO—$R^z$, NH—CO—$R^z$, O—CO—$OR^z$, in which $R^z$ is each independently hydrogen, chlorine, C1-C6 alkyl or alkylene, phenyl or C1-C6 alkoxy.

Preferably, one or more radicals $R^4$-$R^9$ are hydrogen.

The compound of general formula IIIa is especially preferably a silane or a siloxane of general formula $R^{10}R^{11}R^{12}Si—CH=CH_2$, in which the radicals $R^{10}$, $R^{11}$ and $R^{12}$ have the definitions and preferred definitions specified above for $R^1$, $R^2$ and $R^3$.

Radicals $R^{10}$, $R^{11}$ and $R^{12}$ are particularly preferably the radicals methyl, methoxy, ethyl, ethoxy, propyl, propoxy, phenyl, chlorine or silyloxy radical, especially of general formula II.

Examples of compounds B are ethylene, propylene, 1-butylene, 2-butylene, cyclohexene,
styrene, α-methylstyrene, 1,1-diphenylethylene, cis-stilbene, trans-stilbene,
allyl chloride, allylamine, acrylonitrile, allyl glycidyl ether, vinyl acetate,
vinyl-Si(CH$_3$)$_2$OMe, vinyl-SiCH$_3$(OMe)$_2$, vinyl-Si(OMe)$_3$ vinyl-Si(CH3)2-[O—Si(CH3)2]n-vinyl where n=0 to 10 000 acetylene, propyne, 1-butyne, 2-butyne and phenylacetylene.

Compounds (A) and (B) may also be bonded to each other by one or more chemical bonds, i.e. they can both be in one molecule.

Compound C comprises one or more cationic Si(II) moieties.

Compound C is preferably a cationic Si(II) compound of general formula IV $$([Si(II)Cp]^+)_a X^{a-} \quad (IV)$$

in which
Cp is a π-bonded cyclopentadienyl radical of general formula V, which is substituted by radicals $R^y$

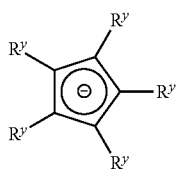

(V)

Cyclopentadienyl radical Cp is understood to mean the cyclopentadienyl anion, which consists of a singly negatively charged aromatic five-membered ring system $C_5R^y{}_5{}^-$.

$R^y$ are any monovalent radicals or polyvalent radicals which can also bond to one another to form fused rings.

Radicals $R^y$ are each independently preferably hydrogen, linear or branched, acyclic or cyclic, saturated or mono- or polyunsaturated C1-C20 alkyl or aryl, particularly preferably C1-C3 alkyl, especially preferably methyl radicals.

Examples of radicals $R^y$ are alkyl radicals such as the methyl, ethyl, n-propyl, isopropyl, n-butyl, sec-butyl, isobutyl, tert-butyl, n-pentyl, sec-pentyl, isopentyl, neopentyl, tert-pentyl radical; hexyl radicals such as the n-hexyl radical; heptyl radicals such as the n-heptyl radical; octyl radicals such as the n-octyl radical and isooctyl radicals such as the 2,4,4-trimethylpentyl radical; nonyl radicals such as the n-nonyl radical; decyl radicals such as the n-decyl radical; dodecyl radicals such as the n-dodecyl radical; hexadecyl radicals such as the n-hexadecyl radical; octadecyl radicals such as the n-octadecyl radical; cycloalkyl radicals such as the cyclopentyl, cyclohexyl, cycloheptyl radical and methylcyclohexyl radical; aryl radicals such as the phenyl, naphthyl, anthryl and phenanthryl radical; alkaryl radicals such as the o-, m- and p-tolyl, xylyl, mesitylenyl and o-, m- and p-ethylphenyl radical; and alkaryl radicals such as the benzyl radical, the α- and β-phenylethyl radical.

Further example of compounds C are the following cationic Si(II) compounds:

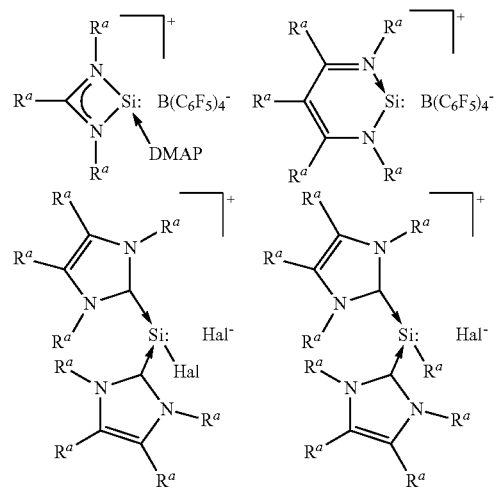

the preparation of which is described in So et al, *Chem. Eur. J.* 2013, 19, 11786, Driess et al., *Angew. Chem. Int. Ed.* 2006, 45, 6730, Filippou, *Angew. Chem. Int. Ed.* 2013, 52, 6974, Sasamori et al, *Chem. Eur. J.* 2014, 20, 9246 and in Inoue et al., *Chem. Commun.* 2014, 50, 12619 (DMAP=dimethylaminopyridine).

In the formulae above, $R^a$ are hydrocarbon radicals. The radicals $R^a$ are preferably each independently alkyl radicals, particularly C1-C20-alkyl radical or substituted or unsubstituted phenyl radical, particularly preferably branched alkyl radical or 2,6-dialkylated phenyl radical. Hal signifies halogen, preferably chlorine, bromine or iodine. Examples of radicals $R^a$ are methyl, isopropyl, tert-butyl, 2,6-diisopropylphenyl or 2,4,6-triisopropylphenyl.

$X^{a-}$ is any a valent anion, which does not react with the cationic silicon(II) center under the reaction conditions of hydrosilylation. It can be either inorganic or organic.

Preferably, a has the values 1, 2 or 3, especially 1.

$X^-$ is preferably halogen or a complex anion such as $BF_4^-$, $ClO_4^-$, $AlZ_4^-$, $MF_6^-$ where Z=halogen and M=P, As or Sb, or tetraaryl borate anion, wherein the aryl radical is preferably phenyl or fluorinated phenyl or phenyl substituted by perfluoroalkyl radicals, monovalent polyhedral anion such as carborate anion for example, or alkoxy and aryloxy metallation.

Examples of anions X⁻ are tetrachlorometallates [MCl$_4$]⁻ where M=Al, Ga, tetrafluoroborates [BF$_4$]⁻, hexafluorometallates [MF$_6$]⁻ where M=As, Sb, Ir, Pt, perfluoroantimonates [Sb$_2$F$_{11}$]⁻, [Sb$_3$F$_{16}$]⁻ and [Sb$_4$F$_{21}$]⁻, triflate (=trifluoromethanesulfonate) [OSO$_2$CF$_3$]⁻, tetrakis(trifluoromethyl)borate [B(CF$_3$)$_4$]⁻, tetrakis(pentafluorophenyl)metallates [M(C$_6$F$_5$)$_4$]⁻ where M=B, Al, Ga, tetrakis(pentachlorophenyl)borate [B(C$_6$Cl$_5$)$_4$]⁻, tetrakis[(2,4,6-trifluoromethyl (phenyl)]borate {B[C$_6$H$_2$(CF$_3$)$_3$]}⁻, [bis[tris(pentafluorophenyl)] hydroxide {HO[B(C$_6$F$_5$)$_3$]$_2$}⁻, closo-carborates [CHB$_{11}$H$_5$Cl$_6$]⁻, [CHB$_{11}$H$_5$Br$_6$]⁻, [CHB$_{11}$(CH$_3$)$_5$Br$_6$]⁻, [CHB$_{11}$F$_{11}$]⁻, [C(Et)B$_{11}$F$_{11}$]⁻, [CB$_{11}$(CF$_3$)$_{12}$]⁻ and B$_{12}$Cl$_{11}$N(CH$_3$)$_3$]⁻, tetra(perfluoroalkoxy)aluminates [Al(OR$^{PF}$)$_4$]⁻, tris(perfluoroalkoxy) fluoroaluminates [FAl(OR$^{PF}$)$_3$]⁻, hexakis (oxypentafluorotellurium)antimonate [Sb(OTeF$_5$)$_6$]⁻.

An overview of particularly preferred complex anions X⁻ can be found, for example, in Krossing et. al., Angew. Chem. 2004, 116, 2116.

The cationic Si(II) compound of general formula IV can be prepared, for example, by adding an acid H⁺X⁻ to the compound Si(II)Cp$_2$, whereupon one of the anionic Cp radicals is eliminated in protonated form:

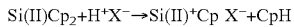

Si(II)Cp$_2$+H⁺X⁻→Si(II)⁺Cp X⁻+CpH

The anion X⁻ of the acid HX then forms the counterion of the cationic silicon(II) compound.

A preparation method for the cationic Si(II) compound of general formula (II) is described in Science 2004, 305, pp. 849-851:

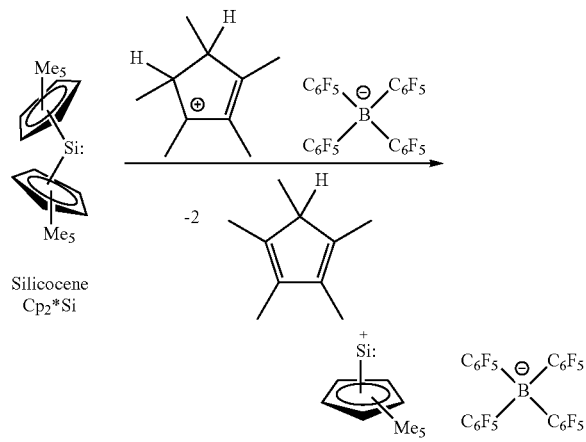

Silicocene
Cp$_2$*Si

The cationic Si(II) compound of general formula (IV) is formed there with the aid of the acid (Cp*H$_2$)⁺ B(C$_6$F$_5$)$_4$⁻ (Cp*=pentamethylcyclopentadienyl). In this case, the compound of formula (IV) is obtained with the counterion X⁻=B(C$_6$F$_5$)$_4$⁻, which can be very readily crystallized and can therefore be particularly easily isolated. The compound of general formula (IV) can also be produced however by addition of other Bronstedt acids, wherein acids are preferred, the anions of which correspond to the specifications of weak coordination stated above.

The invention also relates to a method for hydrosilylating mixture M comprising
(A) a compound having at least one hydrogen atom bonded directly to Si,
(B) a compound comprising at least one carbon-carbon multiple bond and
(C) a compound comprising at least one cationic Si(II) moiety.

In the method, compound A is reacted with compound B in the presence of compound C as hydrosilylation catalyst.

The molar ratio of compounds A and B, based on the Si—H and unsaturated carbon moieties present, is preferably at least 1:100 and at most 100:1, particularly preferably at least 1:10 and at most 10:1, especially preferably at least 1:2 and at most 2:1.

The molar ratio between compound C and the Si—H moieties present in compound A is preferably at least 1:10⁷ and at most 1:1, particularly preferably at least 1:10⁶ and at most 1:10, especially preferably at least 1:105 and at most 1:50.

Compounds A, B and C can be mixed in any sequence, wherein the mixing is carried out in a manner known to those skilled in the art. It is also possible to mix compounds A and B or A and C or B and C and then to add the missing compound. In a further embodiment, compound C is generated in compound A or B or in the mixture of the two compounds, for example by the protonation reaction described above.

The reaction of compounds A and B in the presence of compound C can be carried out with or without addition of one or more solvents. The proportion of solvent or solvent mixture, based on the sum total of compounds A and B, is preferably at least 0.1% by weight and at most the 1000-fold amount by weight, particularly preferably at least 10% by weight and at most the 100-fold amount by weight, especially preferably at least 30% by weight and at most the 10-fold amount by weight.

The solvents used can be preferably aprotic solvents, for example hydrocarbons such as pentane, hexane, heptane, cyclohexane or toluene, chlorohydrocarbons such as dichloromethane, chloroform, chlorobenzene or 1,2-dichloroethane, ethers such as diethyl ether, methyl tert-butyl ether, anisole, tetrahydrofuran or dioxane, or nitriles such as acetonitrile or propionitrile.

The mixture M may comprise any desired further compounds such as, e.g. processing aids, e.g. emulsifiers, fillers, e.g. highly dispersed silica or quartz, stabilizers, e.g. radical inhibitors, pigments, e.g. dyes or white pigments, e.g. chalk or titanium dioxide.

The reaction can be carried out at atmospheric pressure or under reduced or elevated pressure.

The pressure is preferably at least 0.01 bar and at most 100 bar, particularly preferably at least 0.1 bar and at most 10 bar, especially preferably the reaction is carried out at atmospheric pressure. However, if compounds are involved in the reaction which are gaseous at the reaction temperature, the reaction is preferably carried out under elevated pressure, particularly preferably at the vapor pressure of the whole system.

The reaction of A and B in the presence of C is preferably conducted at temperatures between at least −100° C. and at most +250° C., particularly preferably between at least −20° C. and at most 150° C., especially preferably between at least 0° C. and at most 100° C.

EXAMPLE 1

Hydrosilylation of α-Methylstyrene with Triethylsilane with Addition of (π-Me$_5$C$_5$)Si$^+$ B(C$_6$F$_5$)$_4^-$ All working steps are carried out under Ar. 120 mg (1.02 mmol) of α-methylstyrene and 116 mg (1.01 mmol) of triethylsilane were each weighed into a screw-topped glass vial and 0.5 ml of CD$_2$Cl$_2$ was added in each case. The two solutions were mixed with each other. Then, at 20° C., a solution of 25.4 mg (0.0302 mmol, 3.0 mol %) of (π-Me$_5$C$_5$) Si$^+$ B(C$_6$F$_5$)$_4^-$ in 1 ml of CD$_2$Cl$_2$ was added to the mixture of α-methylstyrene and triethylsilane.

After one hour, ca. 30% of triethylsilane had reacted and overnight the reaction was complete (monitoring of the reaction by NMR spectroscopy). The product phenyl-CH(CH$_3$)—CH$_2$—Si(ethyl)$_3$ was formed.

The $^1$H-NMR signal of the catalyst (π-Me$_5$C$_5$)Si$^+$ B(C$_6$F$_5$)$_4^-$ at δ=2.22 ppm was detected in unaltered amount; there was no measurable decrease.

EXAMPLE 2

Hydrosilylation of α-Methylstyrene with Triethylsilane with Addition of (π-Me$_5$C$_5$)Si$^+$ B(C$_6$F$_5$)$_4^-$ All working steps are carried out under Ar. 236 mg (2.00 mmol) of α-methylstyrene and 233 mg (2.00 mmol) of triethylsilane were each weighed into a screw-topped glass vial and 0.5 ml of CD$_2$Cl$_2$ was added in each case. The two solutions were mixed with each other. Then, at 20° C., a solution of 6.4 mg (0.0075 mmol, 0.38 mol %) of (π-Me$_5$C$_5$) Si$^+$ B(C$_6$F$_5$)$_4^-$ in 1 ml of CD$_2$Cl$_2$ was added to the mixture of α-methylstyrene and triethylsilane.

After one hour, ca. 35% of triethylsilane had reacted and overnight the reaction was complete (monitoring of the reaction by NMR spectroscopy). The product phenyl-CH(CH$_3$)—CH$_2$—Si(ethyl)$_3$ was formed. The $^1$H-NMR signal of the catalyst (π-Me$_5$C$_5$)Si$^+$ B(C$_6$F$_5$)$_4^-$ at δ=2.22 ppm was detected in unaltered amount; there was no measurable decrease.

EXAMPLE 3

Hydrosilylation of α-Methylstyrene with Dimethylphenylsilane with Addition of (π-Me$_5$C$_5$)Si$^+$ B(C$_6$F$_5$)$_4^-$ All working steps are carried out under Ar. 236 mg (2.00 mmol) of α-methylstyrene and 272 mg (2.00 mmol) of dimethylphenylsilane were each weighed into a screw-topped glass vial and 0.5 ml of CD$_2$Cl$_2$ was added in each case. The two solutions were mixed with each other. Then, at 20° C., a solution of 25.4 mg (0.0075 mmol, 0.38 mol %) of (π-Me$_5$C$_5$)Si$^+$ B(C$_6$F$_5$)$_4^-$ in 1 ml of CD$_2$Cl$_2$ was added to the mixture of α-methylstyrene and dimethylphenylsilane.

After one hour, >90% of dimethylphenylsilane had reacted and overnight the reaction was complete (monitoring of the reaction by NMR spectroscopy). The product phenyl-CH(CH$_3$)—CH$_2$—Si(CH$_3$)$_2$phenyl was formed. The $^1$H-NMR signal of the catalyst (π-Me$_5$C$_5$)Si$^+$ B(C$_6$F$_5$)$_4^-$ at δ=2.20 ppm was detected in unaltered amount; there was no measurable decrease.

EXAMPLE 4

Hydrosilylation of α-Methylstyrene with Pentamethyldisiloxane with Addition of (π-Me$_5$C$_5$)Si$^+$ B(C$_6$F$_5$)$_4^-$ All working steps are carried out under Ar. 119 mg (1.01 mmol) of α-methylstyrene and 148 mg (1.00 mmol) of pentamethyldisiloxane were each weighed into a screw-topped glass vial and 0.5 ml of CD$_2$Cl$_2$ was added in each case. The two solutions were mixed with each other. Then, at 20° C., a solution of 1.8 mg (0.0021 mmol, 0.21 mol %) of (π-Me$_5$C$_5$)Si$^+$ B(C$_6$F$_5$)$_4^-$ in 1 ml of CD$_2$Cl$_2$ was added to the mixture of α-methylstyrene and pentamethyldisiloxane.

After one hour, the reaction was complete ($^1$H-NMR spectrum). The product phenyl-CH(CH$_3$)—CH$_2$—Si(CH$_3$)$_2$—O—Si(CH$_3$)$_3$ was formed. The $^1$H-NMR signal of the catalyst (π-Me$_5$C$_5$)Si$^+$ B(C$_6$F$_5$)C$_4^-$ at δ=2.20 ppm was detected in unaltered amount; there was no measurable decrease.

The invention claimed is:

1. A hydrosilylatable mixture M comprising:
   (A) a compound having at least one hydrogen atom bonded directly to Si,
   (B) a compound comprising at least one carbon-carbon multiple bond and
   (C) a compound comprising at least one cationic Si(II) moiety,
   wherein the compound C is a cationic Si(II) compound of formula IV $$([Si(II)Cp]^+)_a X^{a-} \qquad (IV)$$

in which
   Cp is a π-bonded cyclopentadienyl radical of formula V, which is substituted by radicals R$^y$,

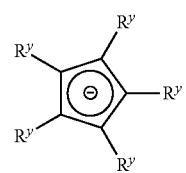

(V)

R$^y$ are monovalent radicals or polyvalent radicals, which are optionally bonded to one another to form one or more fused rings and
   X$^-$ signifies an a valent anion, which does not react with the cationic silicon(II) under the reaction conditions of hydrosilylation.

2. The hydrosilylable mixture M of claim 1, wherein at least one compound A has the formula I $$R^1R^2R^3Si—H \qquad (I)$$

wherein the radicals R$^1$, R$^2$ and R$^3$ each independently are hydrogen, halogen, silyloxy radical, hydrocarbon radical or hydrocarbonoxy radical, wherein individual carbon atoms in each case may be replaced by oxygen atoms, silicon atoms, nitrogen atoms, halogen, sulfur or phosphorus atoms.

3. The hydrosilylable mixture M of claim 1, wherein compound B is selected from the group consisting of compounds of the formula IIIa $$R^4R^5C=CR^6R^7 \qquad (IIIa),$$

of formula IIIb $$R^8C≡CR^9 \qquad (IIIb),$$

and mixtures thereof, wherein

R$^4$, R$^5$, R$^6$, R$^7$, R$^8$ and R$^9$ are each independently linear, branched, acyclic or cyclic, saturated or mono- or polyunsaturated C1-C20 hydrocarbon radicals, wherein individual carbon atoms may be replaced by silicon, oxygen, halogen, nitrogen, sulfur or phosphorus.

4. The hydrosilylable mixture M of claim 1, wherein R$^a$ is an unbranched alkyl radical or 2,6-dialkylated phenyl radical.

5. The hydrosilylable mixture M of claim 1, wherein the molar ratio between compound C and Si—H moieties present in compound A is from 1:10$^7$ to 1:50.

6. A method for hydrosilylating a mixture M comprising a compound A having at least one silicon-bonded hydrogen atom and a compound B having at least one carbon-carbon multiple bond, comprising:

reacting compound A with compound B in the presence of a compound C as a hydrosilylation catalyst, wherein the compound C comprises at least one cationic Si(II) moiety, and the compound C comprises a cationic Si(II) compound of formula IV ([Si(II)Cp]$^+$)$_a$X$^{a-}$ (IV)

in which

Cp is a π-bonded cyclopentadienyl radical of formula V, which is substituted by radicals R$^y$,

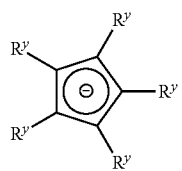
(V)

R$^y$ are monovalent radicals or polyvalent radicals, which are optionally bonded to one another to form one or more fused rings and X$^-$ signifies an a valent anion, which does not react with cationic silicon(II) under the reaction conditions of hydrosilylation.

7. The method of claim 6, wherein the compound A has the formula I

R$^1$R$^2$R$^3$Si—H (I)

wherein the radicals R$^1$, R$^2$ and R$^3$ each independently are hydrogen, halogen, silyloxy radical, hydrocarbon radical or hydrocarbonoxy radical, wherein individual carbon atoms in each case may be replaced by oxygen atoms, silicon atoms, nitrogen atoms, halogen, sulfur or phosphorus atoms.

8. The method of claim 6, wherein at least one compound B is selected from the group consisting of compounds of the formula IIIa R$^4$R$^5$C═CR$^6$R$^7$, (IIIa), formula IIIb R$^8$C≡CR$^9$ (IIIb), and mixtures thereof, wherein R$^4$, R$^5$, R$^6$, R$^7$, R$^8$ and R$^9$ are each independently linear, branched, acyclic or cyclic, saturated or mono- or polyunsaturated C1-C20 hydrocarbon radicals, wherein individual carbon atoms may be replaced by silicon, oxygen, halogen, nitrogen, sulfur or phosphorus.

9. The method of claim 6, wherein R$^a$ is an unbranched alkyl radical or 2,6-dialkylated phenyl radical.

10. The method of claim 6, wherein the molar ratio between the compound C and the Si—H moieties present in the compound A is from 1:10$^7$ to 1:50.

\* \* \* \* \*